(12) United States Patent
Eilers et al.

(10) Patent No.: US 11,525,525 B2
(45) Date of Patent: Dec. 13, 2022

(54) APPARATUS FOR NOISE REDUCTION IN VALVES

(71) Applicant: FISHER CONTROLS INTERNATIONAL LLC, Marshalltown, IA (US)

(72) Inventors: Daniel James Eilers, Marshalltown, IA (US); Allen Carl Fagerlund, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 17/107,399

(22) Filed: Nov. 30, 2020

(65) Prior Publication Data
US 2022/0170569 A1 Jun. 2, 2022

(51) Int. Cl.
*F16K 47/12* (2006.01)
*F16K 47/06* (2006.01)

(52) U.S. Cl.
CPC .............. *F16K 47/12* (2013.01); *F16K 47/06* (2013.01)

(58) Field of Classification Search
CPC ................................. F16K 47/06; F16K 47/12
USPC ......................................................... 251/126
See application file for complete search history.

(56) References Cited

U.S. PATENT DOCUMENTS

| | | | | |
|---|---|---|---|---|
| 1,990,371 A * | 2/1935 | Chadwick | ............. | G05D 16/10 137/493.5 |
| 2,649,273 A * | 8/1953 | Honegger | ................. | F16K 1/42 251/126 |
| 3,447,566 A * | 6/1969 | Sharpe | ..................... | 137/489.5 |
| 3,469,591 A * | 9/1969 | Odendahl | ............... | F16K 47/06 137/14 |
| 3,990,475 A * | 11/1976 | Myers | ..................... | F16K 3/34 137/625.3 |
| 4,185,664 A * | 1/1980 | Zabsky | ..................... | F15C 1/02 138/40 |
| 5,070,909 A * | 12/1991 | Davenport | ............ | F16K 5/0605 137/625.32 |
| 5,180,139 A * | 1/1993 | Gethmann | ............ | F16K 5/0605 137/625.32 |
| 5,400,825 A * | 3/1995 | Gethmann | ............ | F16K 5/0605 137/625.32 |
| 5,988,586 A * | 11/1999 | Boger | ..................... | F16K 47/08 138/42 |
| 6,283,148 B1 * | 9/2001 | Spears | ................ | F04B 53/1005 137/533.11 |

(Continued)

OTHER PUBLICATIONS

Wang et al., "Impact of Shear Layer Swirl on Near- and Far-field Noise Emissions from Twin-Engine Military Aircraft," Final Report, SERDP Project WP19-1288, University of Kansas, Jun. 2020, 29 pages.

*Primary Examiner* — Matthew W Jellett
(74) *Attorney, Agent, or Firm* — Hanley, Flight & Zimmerman, LLC

(57) ABSTRACT

An apparatus for noise reduction in valves is disclosed. A disclosed example valve includes a valve body including a fluid passageway, and a cage located in the fluid passageway, the cage including a wall having openings, a fluid to flow from an inner surface of the wall to an outer surface of the wall through the openings, each of the openings including respective ribs, the ribs to follow a helical path along a length of each opening to cause rotation of the fluid flowing through the openings.

17 Claims, 6 Drawing Sheets

(56) References Cited

U.S. PATENT DOCUMENTS

| | | | |
|---|---|---|---|
| 7,028,976 B2 * | 4/2006 | Bachmann | F16K 47/16 |
| | | | 251/324 |
| 8,701,707 B2 * | 4/2014 | Moosmann | F16D 48/02 |
| | | | 137/596.17 |
| 10,012,236 B2 | 7/2018 | Fagerlund et al. | |
| 2010/0163651 A1 * | 7/2010 | Feith | F16K 47/08 |
| | | | 239/542 |

* cited by examiner

APPARATUS FOR NOISE REDUCTION IN VALVES

FIELD OF THE DISCLOSURE

This disclosure relates generally to valves and, more particularly, to apparatus for noise reduction in valves.

BACKGROUND

Valves are used to control flow of a fluid through a conduit. Globe valves typically include a valve cage with openings through which the fluid can flow when the valve is opened. Some valves, such as ball valves, may include a noise attenuator having openings through which fluid flows. As the fluid exits the openings of the cage or noise attenuator, the fluid interacts with a relatively stationary or low velocity fluid at the outlet of the valve to generate noise.

SUMMARY

An example valve a valve body including a fluid passageway, and a cage located in the fluid passageway, the cage including a wall having openings, a fluid to flow from an inner surface of the wall to an outer surface of the wall through the openings, each of the openings including respective ribs, the ribs to follow a helical path along a length of each opening to cause rotation of the fluid flowing through the openings.

An example cage to be located in a fluid passageway of a valve includes a wall having openings, a fluid to flow from an inner surface of the wall to an outer surface of the wall through the openings, each of the openings including respective elongated protrusions, the protrusions to follow a curved path along a length of each opening to cause rotation of the fluid flowing through the openings.

An example apparatus includes means for providing a fluid passageway, and means for allowing a fluid to flow therein, the means for allowing the fluid to flow to include means for reducing noise through the fluid passageway, each of the means for reducing noise including respective means for generating rotation of the fluid.

Figure 1:
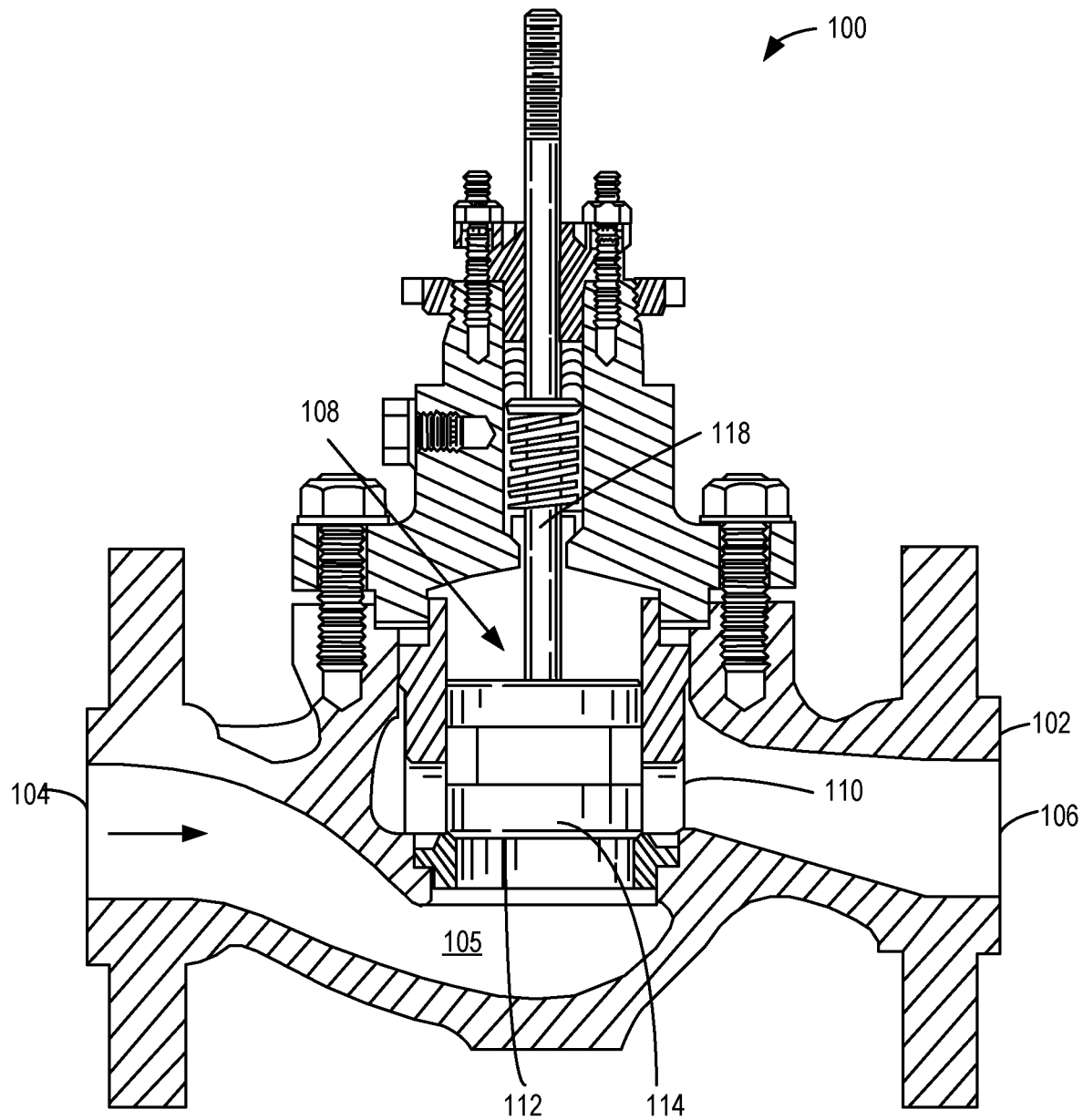
FIG. 1 illustrates a globe valve in which examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Valves are typically implemented on a fluid conduit to control the flow of a fluid from a first location to a second location. When the valve is in a closed position, the valve prevents fluid in a high-pressure region at the valve inlet from flowing to a lower-pressure region at the valve outlet. Alternatively, when the valve is opened, the valve allows fluid to flow from the high-pressure region to the lower-pressure region. Opening and closing of the valve can be performed manually or via a command signal from a process control system communicatively coupled to the valve.

In some cases, a trim assembly of a valve includes a cage to reduce pressure of the fluid flowing through the valve. Typically, the cage includes openings through which the fluid travels when exiting the valve. The openings may be cylindrical with circular cross-sections. In some cases, the openings can be implemented on an attenuator (e.g., domed attenuator, dome) of a ball valve. The fluid is at a relatively high pressure upon entering the openings, and the fluid is at a reduced pressure upon exiting the openings. The fluid increases in velocity as the fluid travels through the openings. As high-velocity fluid exits the openings, the high-velocity fluid interacts with relatively stationary or low velocity fluid at the lower-pressure region. The interaction of fluids occurs at a shear layer between the high-velocity fluid and the stationary or low velocity fluid. In such cases, noise is caused by an increase in turbulence at the shear layer.

Examples disclosed herein reduce noise during operation of the valve (e.g., globe valves, ball valves, etc.) by generating fluid swirl at the exit of the openings via swirl generators. Example swirl generators described herein are structures that cause the fluid to rotate or swirl as the fluid exits the openings of a cage or noise attenuator. More specifically, the example swirl generators disclosed herein interrupt formation of turbulence at the shear layer by causing rotation of the fluid traveling through the openings. The example swirl generators disclosed herein include ribs (e.g., helical ribs, protrusions, elongated protrusions) within each opening. The ribs cause the fluid to travel along a path (e.g., helical path, curved path) through the openings. The path can vary based on pitch, length, and cross-sectional geometry of the ribs. Travel of the fluid along the path causes rotation of the fluid about the longitudinal axes of the openings. In some examples, the ribs can be implemented inside a fluid passageway of a ball valve to generate swirl as the fluid exits the ball valve. While examples disclosed herein can be used in any type of valve, examples disclosed herein may be particularly useful in sliding stem control valves, rotary valves, or as in-line diffusers.

FIG. 1 illustrates a known globe valve 100 on which examples disclosed herein can be implemented. The globe valve 100 includes a valve body 102 having a fluid inlet 104 and a fluid outlet 106 connected by a fluid passageway 105. The globe valve 100 further includes a trim assembly 108 positioned inside the valve body 102 between the fluid inlet 104 and the fluid outlet 106. The trim assembly 108 includes a cage 110 and a seat 112. A plug (e.g., fluid control member) 114 of the globe valve 100 is slidably disposed in the cage 110, and the plug 114 moves relative to the seat 112 to control fluid flow through the valve body 102. The plug 114 is coupled to an actuator (not shown) via a stem 118. The actuator moves the plug 114 upward in the valve body 102 to open the globe valve 100 and allow fluid to flow from the fluid inlet 104 to the fluid outlet 106. Alternatively, the actuator moves the plug 114 downward to close the globe valve 100 and prevent fluid from flowing between the fluid inlet 104 and the fluid outlet 106. In some examples, the globe valve 100 can be partially opened or closed to control the flow rate of fluid through the globe valve 100. In some examples, the actuator can be manually operated or can be controlled via an electrical signal from a computer system coupled to the actuator.

Figure 2:
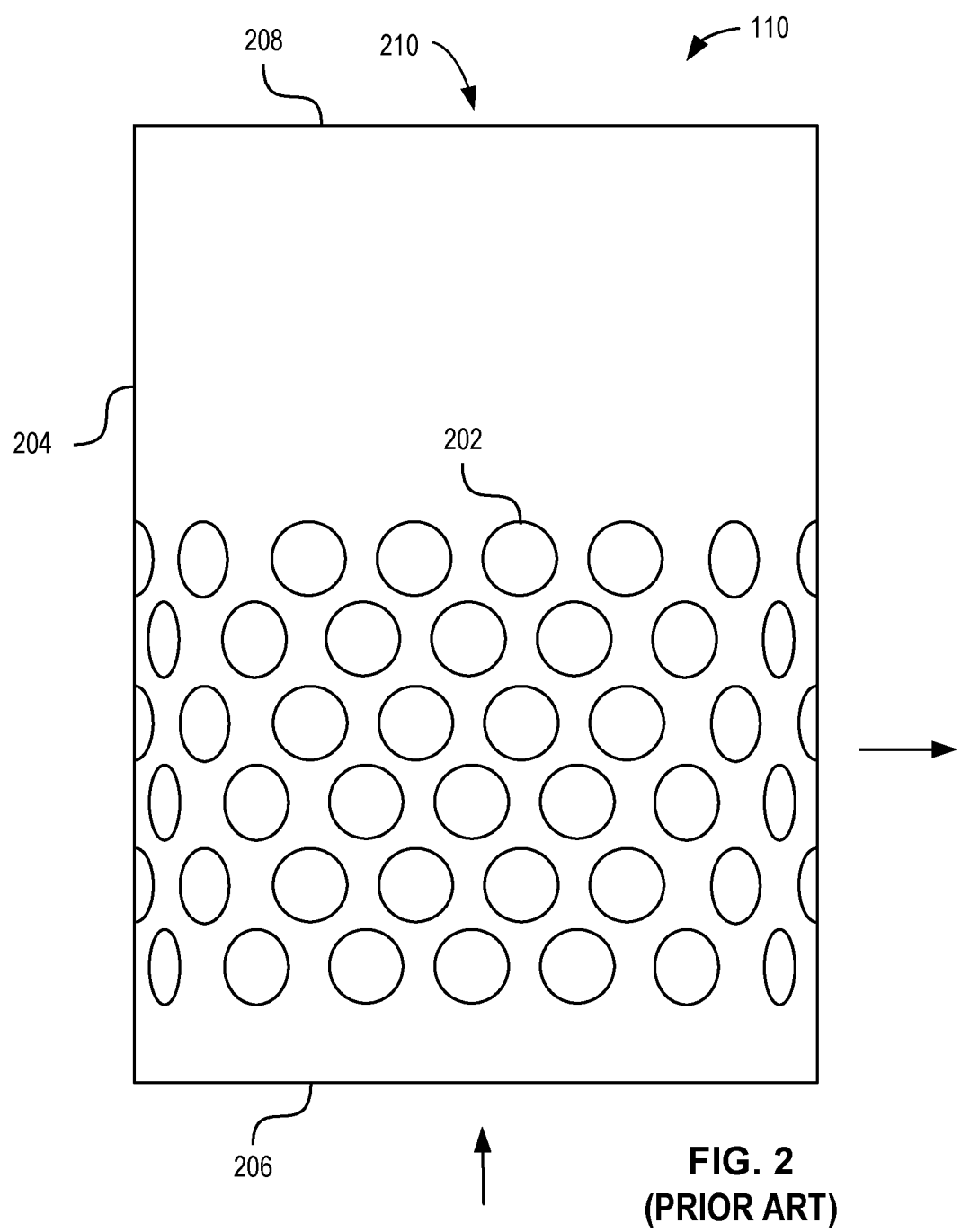
FIG. 2 illustrates a cage from the globe valve of FIG. 1.

FIG. 2 illustrates the cage 110 from the globe valve 100 of FIG. 1. In FIG. 2, the cage 110 includes openings 202 that extend through a cage wall (e.g., wall) 204 of the cage 110. The wall 204 extends between an example bottom end 206 and an example top end 208 to form a central bore 210. The plug 114 of FIG. 1 can slide within the central bore 210 to control fluid flow through the cage 110. As fluid travels from the fluid inlet 104 to the fluid outlet 106 of FIG. 1, the fluid enters the cage 110 via the bottom end 206 and exits the cage 110 via the openings 202. The fluid is at a relatively high pressure upon entering the cage 110 and is at a relatively lower pressure upon exiting the cage 110.

In FIG. 2, the openings 202 are cylindrical passages with circular cross-sections. However, the openings 202 can have a different cross-sectional shape. For example, the openings 202 can have an elliptical or rectangular cross-sectional shape. The openings 202 are of a uniform size and shape and are uniformly spaced across a surface of the cage 110. In some examples, the size, shape, and/or spacing of the openings 202 can be different. The number of the openings 202 and/or the sizes of the openings 202 can be increased or reduced to change the flow and/or pressure characteristics of the cage 110.

Figure 3:
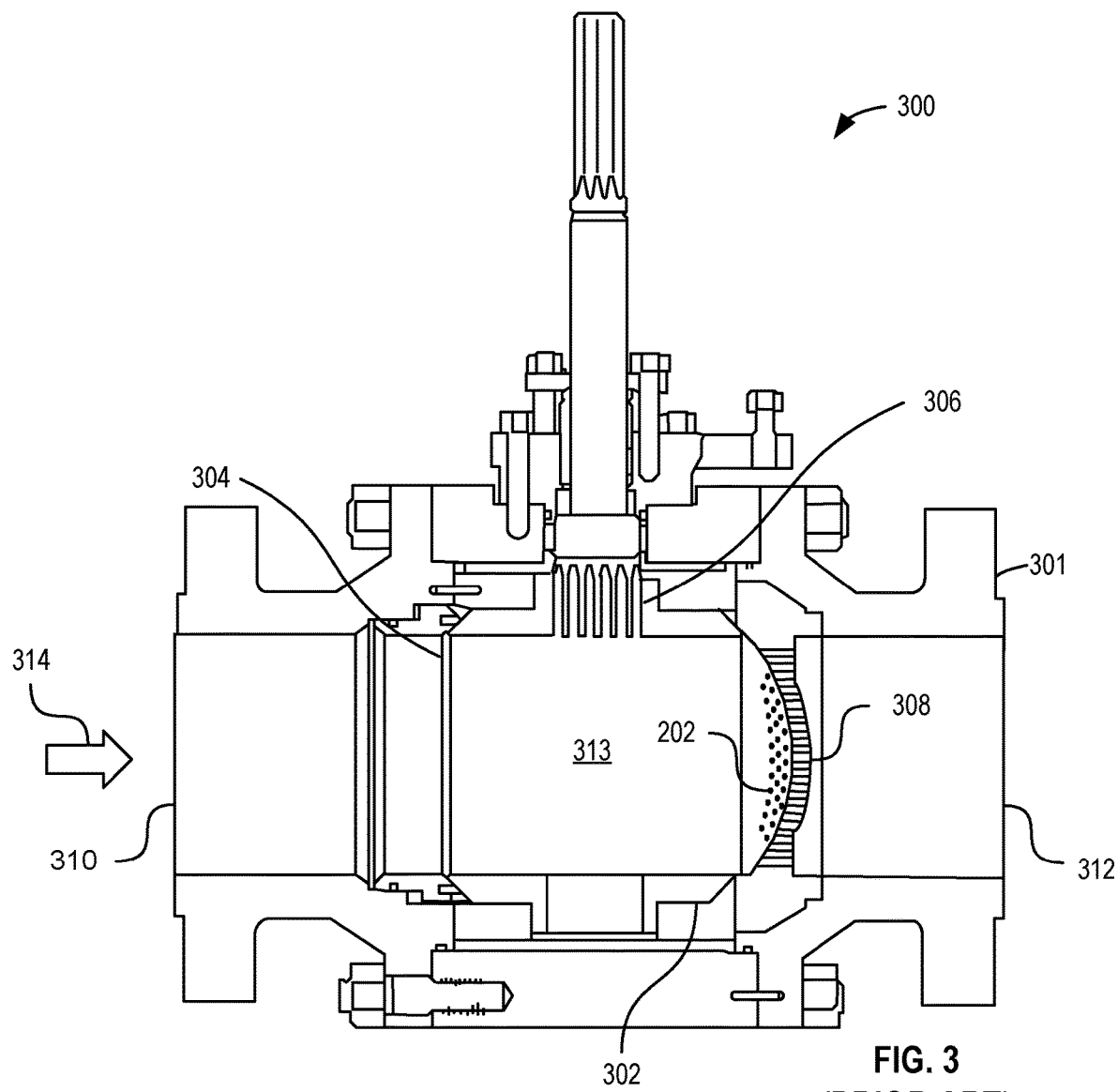
FIG. 3 illustrates a ball valve in which examples disclosed herein can be implemented.

FIG. 3 illustrates a ball valve 300 in which examples disclosed herein can be implemented. The ball valve 300 includes a ball valve body 301, a ball 302, a ball seal 304, a shaft 306 coupled to the ball 302, and an attenuator 308. Fluid flows through the ball valve body 301 from a fluid inlet 310 to a fluid outlet 312.

With the ball valve 300 in an open position, fluid flows through a cylindrical passageway 313 of the ball 302 and the attenuator 308 in a direction 314. The attenuator 308 is dome-shaped and can vary in thickness along a diameter of the attenuator 308. The attenuator 308 includes the openings 202 of FIG. 2 uniformly spaced across the attenuator 308. In some examples, the size, shape, and/or spacing of the openings 202 can be different. The attenuator 308 can reduce the pressure of the fluid flowing through the openings 202 and/or reduce noise generated during operation of the ball valve 300.

When operating the ball valve 300 and/or the globe valve 100 of FIG. 1 to move from the closed position to the open position, a fluid flowing from an upstream high-pressure region interacts with fluid (e.g., stationary fluid) at a downstream lower-pressure region (e.g., at the fluid outlet 106 of FIG. 1 and/or the fluid outlet 312 of FIG. 3). In such examples, the interaction between the high-pressure fluid and the lower-pressure fluid occurs at a shear layer, and turbulence caused by the interaction at the shear layer generates noise. In some examples, the openings 202 in the cage 110 of FIGS. 1 and/or 2 and in the attenuator 308 can modify the flow of the fluid to reduce turbulence at the shear layer, thereby reducing the noise generated.

Figure 4:
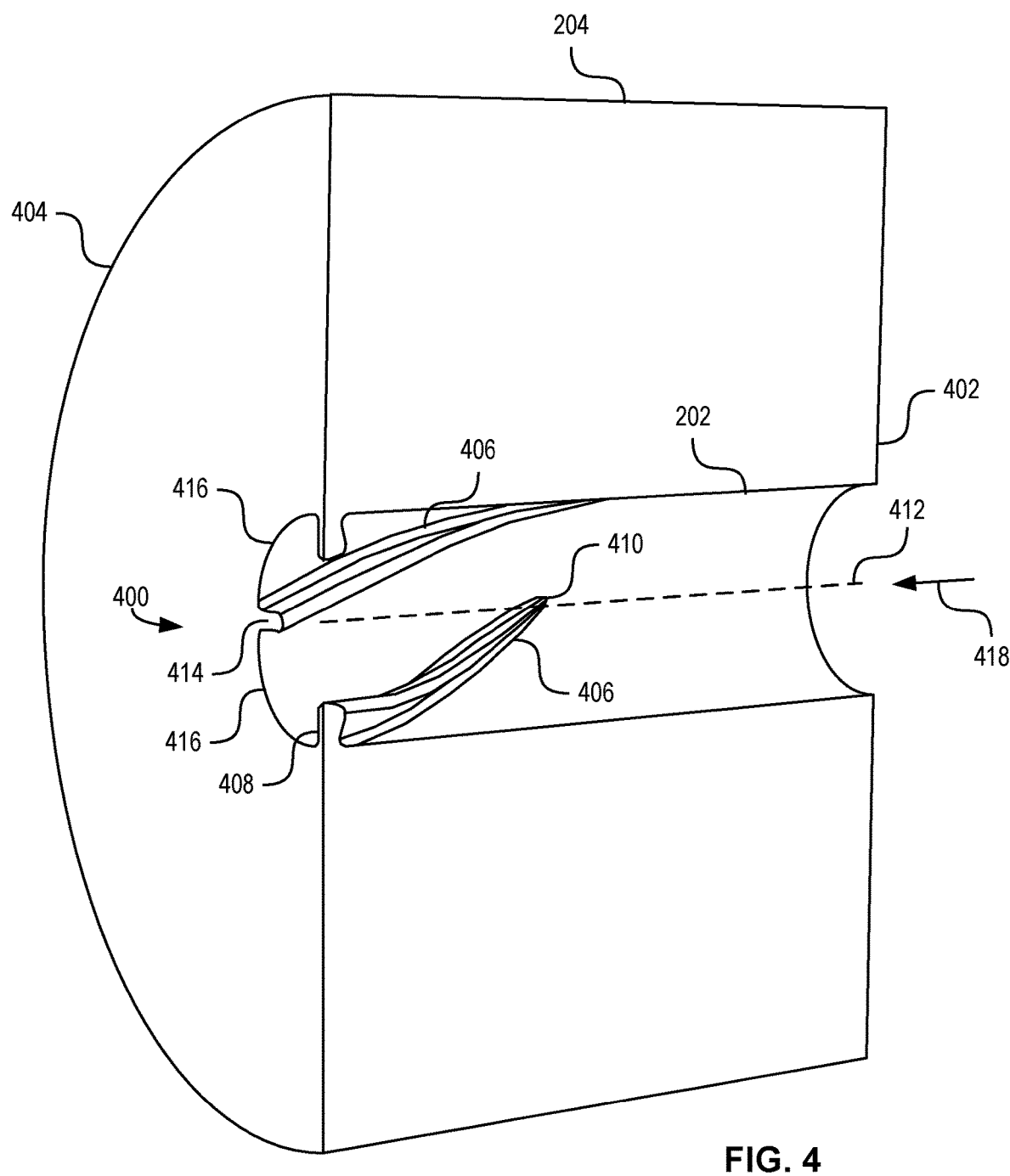
FIG. 4 illustrates an example swirl generator implemented on the openings of FIGS. 2 and/or 3.

FIG. 4 illustrates an example swirl generator 400 that may be implemented on the openings 202 of FIGS. 2 and/or 3. In the illustrated example, a cross-sectional view 401 of the openings 202 is shown. Each of the openings 202 extends through the wall 204 between an example inner surface 402 and an example outer surface 404, where fluid flows from the inner surface 402 to the outer surface 404. Alternatively, in some examples, the fluid can flow from the outer surface 404 to the inner surface 402. In some examples, the swirl generator 400 can be implemented on the cylindrical passageway 313 of the ball valve 300 of FIG. 3. In some such examples, the ball valve 300 does not include the attenuator 308 and/or the openings 202.

In FIG. 4, the swirl generator 400 includes example ribs (e.g. helical ribs, protrusions, elongated protrusions) 406 coupled to the openings 202. In FIG. 4, two of four ribs 406 are shown. However, the swirl generator 400 can be implemented with any number of the ribs 406, preferably at least two. In some examples, implementing a smaller number of the ribs 406 can reduce pressure loss of the fluid caused by interaction between the fluid and the ribs 406. Implementing a smaller number of the ribs 406 can also reduce manufacturing complexity of the swirl generator 400.

In the illustrated example of FIG. 4, the ribs 406 are positioned inside one of the openings 202, with an example first end 408 of the ribs 406 at the outer surface 404 of the wall 204. The ribs 406 extend inward into the openings 202. The ribs 406 terminate at a second end (e.g., point, terminal point) 410 inside of the openings 202. Alternatively, in some examples, the first end 408 of the ribs 406 is positioned at the inner surface 402 of the wall 204. In such examples, the ribs 406 extend inward into the openings 202 in an example direction 418 and terminate at the second end 410 inside of the openings 202.

In the illustrated example of FIG. 4, a distance between the first end 408 and the second end 410 is approximately half of a thickness of the wall 204, where the distance is measured along an example longitudinal axis (e.g., axis) 412. In some examples, the distance between the first end 408 and the second end 410 is no more than the thickness of the wall 204, and the distance is the same across each of the ribs 406. In the illustrated example, an area of an example cross-section 414 of each of the ribs 406 decreases across the distance from the first end 408 to the second end 410.

In the illustrated example of FIG. 4, a pitch of the ribs 406 is the same across each of the ribs 406. In examples disclosed herein, the pitch refers to a length of a helical axis (e.g., the axis 412) traveled to complete one turn (e.g., revolution, rotation) about the axis 412. In the illustrated example, the ribs 406 travel approximately one quarter (i.e., 90 degrees) of a turn between the first end 408 and the second end 410. Thus, the pitch of the ribs 406 is approximately four times the distance between the first end 408 and the second end 410 (e.g., approximately two times the thickness of the wall 204). In some examples, the pitch of the ribs 406 can increase or decrease to change a rotation of fluid flowing through the openings 202. For example, reducing the pitch (e.g., increasing the turn traveled in a given length) of the ribs 406 increases the rotation rate of the fluid. Similarly, increasing the pitch (e.g., reducing the turn traveled in the given length) reduces the rotation rate of the fluid.

In the illustrated example of FIG. 4, spaces between the ribs 406 define example channels 416 through which the fluid can travel. In FIG. 4, fluid flows through the swirl generator 400 in the direction 418. As the fluid flows through the channels 416, the ribs 406 cause the fluid to rotate along a path (e.g., helical path, curved path) about the axis 412. The fluid (e.g., rotating fluid) exits the wall 204 and interacts with fluid (e.g., stationary fluid) near the outer surface 404. The rotation disrupts formation of turbulence at a shear layer, thereby reducing noise caused by the turbulence. Advantageously, examples implementing the swirl generator 400 provide a greater reduction in noise compared to known devices in which the ribs 406 are absent from the openings 202.

Figure 5:
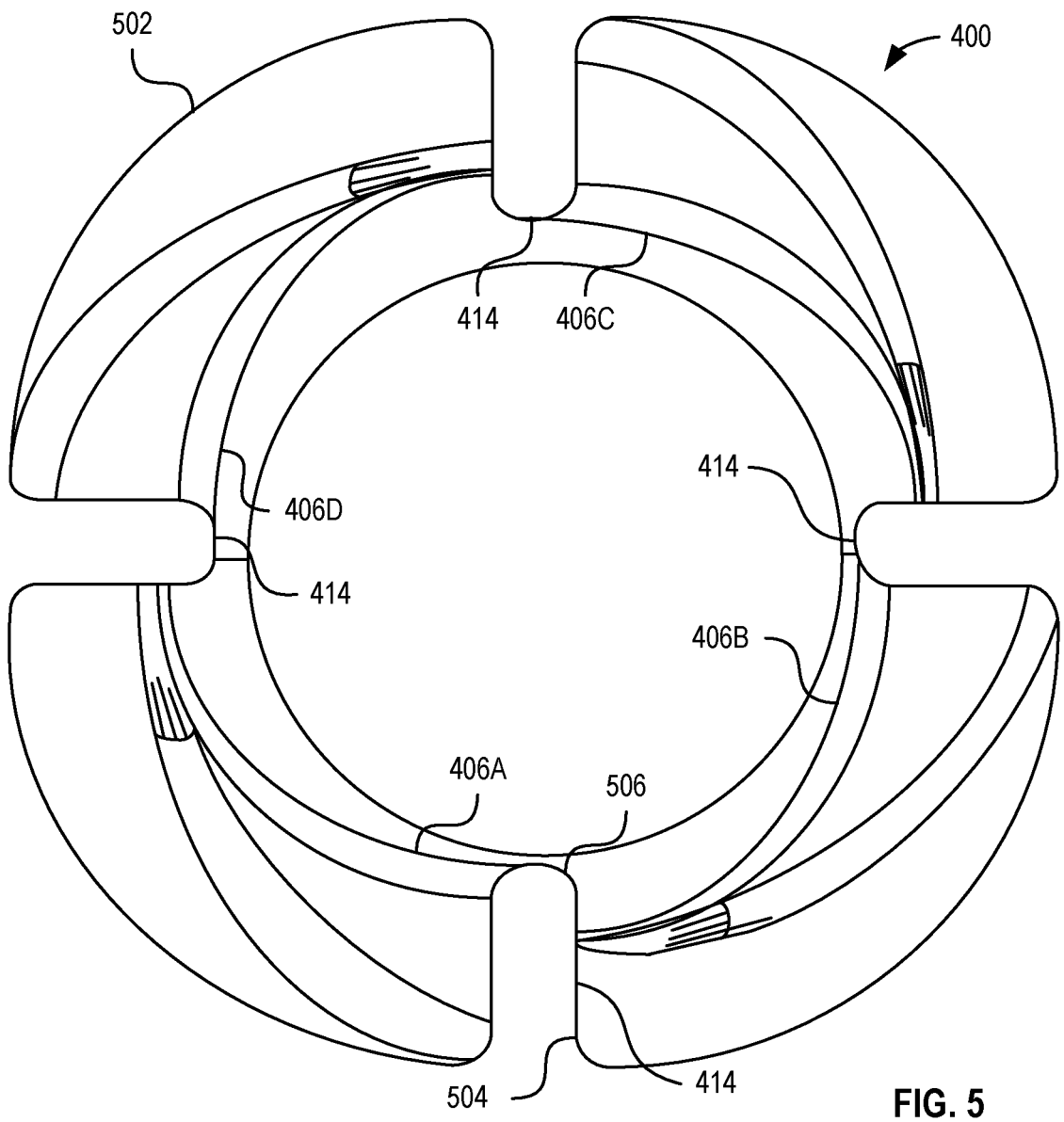
FIG. 5 illustrates an end view of the example swirl generator of FIG. 4.

FIG. 5 illustrates an end view of the example swirl generator 400 of FIG. 4. In the illustrated example of FIG. 5, the cross-section 414 of FIG. 4 is shown for four of the ribs 406. For example, the swirl generator 400 includes an example first rib 406A, an example second rib 406B, an example third rib 406C, and an example fourth rib 406D. The cross-section 414 corresponding to each of the ribs 406 is positioned about an example circumference 502 of the openings 202 of FIGS. 2, 3, and/or 4. The ribs 406 are equally spaced about the circumference 502 by an offset of 90 degrees. For example, the second rib 406B, the third rib 406C, and the fourth rib 406D are positioned 90 degrees counterclockwise, 180 degrees, and 90 degrees clockwise (e.g., 270 degrees counterclockwise) from the first rib 406A, respectively. As such, the swirl generator 400 is symmetric about the circumference 502. In some examples, when a different number of the ribs 406 is used, the offset between the ribs 406 can be different so that the ribs 406 are equally spaced around the circumference 502. For example, when six of the ribs 406 are used, the ribs 406 can be spaced around the circumference 502 by an offset of 60 degrees. In some examples, an even number of the ribs 406 is used to ensure that the swirl generator 400 is symmetric about the circumference 502.

In the illustrated example of FIG. 5, the cross-section 414 of each of the ribs 406 is rectangular with rounded edges. In some examples, a different shape, width, or height of the cross-section 414 can be used. In the illustrated example, a first radius of the rounded edges is at a base or outer edge 504 of the cross-section 414 and a second radius is at a top or inner edge 506 of the cross-section 414. In some examples, the first radius at the outer edge 504 can be the same as or different from the second radius at the inner edge 506. In examples disclosed herein, edges (e.g., the outer edge 504 and/or the inner edge 506) of the ribs 406 are rounded to reduce edge effects on the fluid through the swirl generator 400 and, in turn, reduce undesired pressure loss of the fluid.

Figure 6:
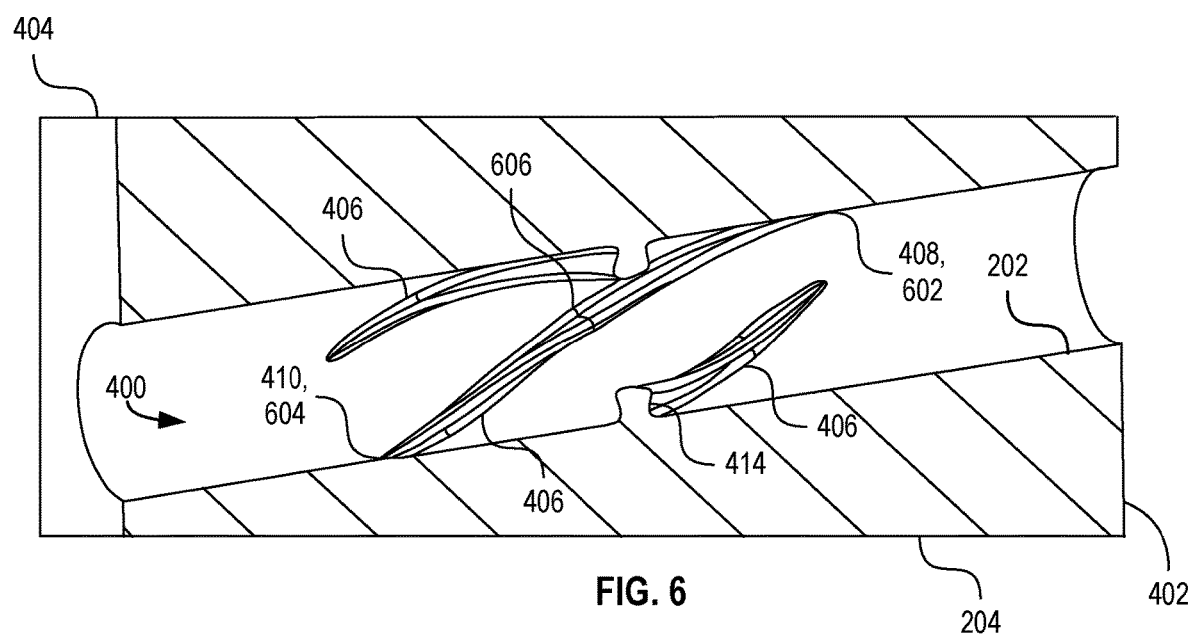
FIG. 6 illustrates the example swirl generator of FIGS. 4 and/or 5 implemented at a different location of the openings of FIGS. 2 and/or 3.

FIG. 6 illustrates the swirl generator 400 of FIGS. 4 and/or 5 implemented at a different location of the openings 202 of FIGS. 2 and/or 3. In the illustrated example of FIG. 6, the example first end 408 of the ribs 406 is at first point 602 inside the wall 204. The example second end 410 of the ribs 406 is at second point 604 inside the wall 204, where the second point 604 is between the first point 602 and the outer surface 404 of the wall 204. The ribs 406 extend between the first end 408 and the second end 410. In the illustrated example of FIG. 6, the area of the cross-section 414 of each of the ribs 406 increases from the first end 408 to an example midpoint 606 of the ribs 406, and the area of the cross-section 414 decreases from the midpoint 606 to the second end 410. In some examples, the first point 602 and the second point 604 can be at any positions along the opening 202 between the inner surface 402 and the outer surface 404 of the wall 204.

In examples disclosed herein, the valve body 102 of FIG. 1, the ball valve body 301, and/or the ball 302 of FIG. 3 may implement means for providing a fluid passageway, the swirl generator 400 may implement means for reducing noise through the fluid passageway, the openings 202 and/or the cylindrical passageway 313 of FIG. 3 may implement means for allowing the fluid to flow therein, and the ribs 406 may implement means for generating rotation of the fluid.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that generate swirl of a fluid flowing through an opening to disrupt formation of turbulence at an outlet of the opening and, thus, reduce noise generated during operation of a valve.

Example methods, apparatus, systems, and articles of manufacture to reduce noise in valves are disclosed herein. Further examples and combinations thereof include the following:

Example 1 includes a valve including a valve body including a fluid passageway, and a cage located in the fluid passageway, the cage including a wall having openings, a fluid to flow from an inner surface of the wall to an outer surface of the wall through the openings, each of the openings including respective ribs, the ribs to follow a helical path along a length of each opening to cause rotation of the fluid flowing through the openings.

Example 2 includes the valve of Example 1, where each opening is cylindrical and has a circular cross-section.

Example 3 includes the valve of Example 1, where the helical path extends along the length of the opening between the outer surface of the wall and a point inside the opening, a distance between the outer surface of the wall and the point being less than a thickness of the wall.

Example 4 includes the valve of Example 3, where an area of a cross-section of each rib decreases over the distance.

Example 5 includes the valve of Example 4, where the cross-section of each rib is rectangular.

Example 6 includes the valve of Example 1, where each rib includes a first radius along a top edge and a second radius along a base edge.

Example 7 includes the valve of Example 1, where the ribs of each opening are equally spaced about a circumference of the opening.

Example 8 includes a cage to be located in a fluid passageway of a valve, the cage including a wall having openings, a fluid to flow from an inner surface of the wall to an outer surface of the wall through the openings, each of the openings including respective elongated protrusions, the protrusions to follow a curved path along a length of each opening to cause rotation of the fluid flowing through the openings.

Example 9 includes the cage of Example 8, where each opening has a circular cross-section.

Example 10 includes the cage of Example 8, where the curved path extends along the length of the opening between the outer surface of the wall a distance less than a thickness of the wall.

Example 11 includes the cage of Example 10, where an area of each protrusion decreases over the distance.

Example 12 includes the cage of Example 11, where a cross-section of each protrusion is rectangular.

Example 13 includes the cage of Example 8, where each protrusion includes a first radius along a top edge and a second radius along a base edge.

Example 14 includes the cage of Example 8, where the protrusions of each opening are spaced about a circumference of the opening.

Example 15 includes an apparatus including means for providing a fluid passageway, and means for allowing a fluid to flow therein, the means for allowing the fluid to flow to include means for reducing noise through the fluid passageway, each of the means for reducing noise including respective means for generating rotation of the fluid.

Example 16 includes the apparatus of Example 15, where each means for allowing the fluid to flow is cylindrical and has a circular cross-section.

Example 17 includes the apparatus of Example 15, where each means for generating rotation of the fluid extends along a length of the means for allowing the fluid to flow between an outer surface of and a point inside the means for allowing the fluid to flow, a distance between the outer surface and the point being less than a thickness of the means for allowing the fluid to flow.

Example 18 includes the apparatus of Example 17, where an area of a cross-section of each means for generating rotation of the fluid decreases over the distance.

Example 19 includes the apparatus of Example 18, where the cross-section of each means for generating rotation of the fluid is rectangular.

Example 20 includes the apparatus of Example 15, where the means for generating rotation of the fluid are equally spaced about a circumference of the means for allowing the fluid to flow.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:
1. A valve comprising:
a valve body including a fluid passageway; and
a cage located in the fluid passageway, the cage including a wall having openings, a fluid to flow from an inner surface of the wall to an outer surface of the wall through the openings, each of the openings including respective ribs, the ribs to define a helical path along a length of each opening to cause rotation of the fluid flowing through the openings, a pitch of the helical path greater than a thickness of the wall, the ribs to extend between a first end and a second end, an area of a cross-section of the ribs to increase from the first end to a midpoint of the ribs, the area of the cross-section of the ribs to decrease from the midpoint to the second end.

2. The valve of claim 1, wherein each opening is cylindrical and has a circular cross-section.

3. The valve of claim 1, wherein the helical path extends along the length of the opening between the outer surface of the wall and a point inside the opening, a distance between the outer surface of the wall and the point being less than the thickness of the wall.

4. The valve of claim 1, wherein the cross-section of each rib is rectangular.

5. The valve of claim 1, wherein each rib includes a first radius along a top edge and a second radius along a base edge.

6. The valve of claim 1, wherein the ribs of each opening are equally spaced about a circumference of the opening.

7. A cage to be located in a fluid passageway of a valve, the cage comprising:

a wall having openings, a fluid to flow from an inner surface of the wall to an outer surface of the wall through the openings, each of the openings including respective elongated protrusions, the protrusions to define a curved path along a length of each opening to cause rotation of the fluid flowing through the openings, a pitch of the curved path greater than a thickness of the wall, the protrusions to extend between a first end and a second end, an area of a cross-section of the protrusions to increase from the first end to a midpoint of the protrusions, the area of the cross-section of the protrusions to decrease from the midpoint to the second end.

8. The cage of claim 7, wherein each opening has a circular cross-section.

9. The cage of claim 7, wherein the curved path extends along the length of the opening from the outer surface of the wall a distance less than the thickness of the wall.

10. The cage of claim 7, wherein the cross-section of each protrusion is rectangular.

11. The cage of claim 7, wherein each protrusion includes a first radius along a top edge and a second radius along a base edge.

12. The cage of claim 7, wherein the protrusions of each opening are spaced about a circumference of the opening.

13. An apparatus comprising:
means for providing a fluid passageway; and
means for allowing a fluid to flow therein, the means for allowing the fluid to flow to include means for reducing noise through the fluid passageway, means for generating rotation of the fluid arranged in each of the means for reducing noise, a pitch of a path of the means for generating rotation of the fluid greater than a thickness of the means for allowing the fluid to flow, the means for generating rotation of the fluid to extend between a first end and a second end, an area of a cross-section of the means for generating rotation of the fluid to increase from the first end to a midpoint of the means for generating rotation of the fluid, the area of the cross-section of the means for generating rotation of the fluid to decrease from the midpoint to the second end.

14. The apparatus of claim 13, wherein each means for allowing the fluid to flow is cylindrical and has a circular cross-section.

15. The apparatus of claim 13, wherein each means for generating rotation of the fluid extends along a length of the means for allowing the fluid to flow between an outer surface of and a point inside the means for allowing the fluid to flow, a distance between the outer surface and the point being less than the thickness of the means for allowing the fluid to flow.

16. The apparatus of claim 13, wherein the cross-section of each means for generating rotation of the fluid is rectangular.

17. The apparatus of claim 13, wherein the means for generating rotation of the fluid are equally spaced about a circumference of the means for allowing the fluid to flow.

* * * * *